US006743867B1

(12) United States Patent
Flosbach et al.

(10) Patent No.: US 6,743,867 B1
(45) Date of Patent: Jun. 1, 2004

(54) COATING AGENTS WHICH CAN BE USED FOR MULTI-LAYER ENAMELING

(75) Inventors: Carmen Flosbach, Wuppertal (DE); Friedrich Herrmann, Wuppertal (DE); Claudia Drewin, Wuppertal (DE); Walter Schubert, Wuppertal (DE); Astrid Tueckmantel, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/958,993

(22) PCT Filed: Apr. 14, 2000

(86) PCT No.: PCT/EP00/03371

§ 371 (c)(1),
(2), (4) Date: Mar. 28, 2002

(87) PCT Pub. No.: WO00/63310

PCT Pub. Date: Oct. 26, 2000

(30) Foreign Application Priority Data

Apr. 16, 1999 (DE) .......................................... 199 17 232

(51) Int. Cl.⁷ .............................................. C08L 71/00
(52) U.S. Cl. ........................ 525/408; 525/108; 525/119; 525/438; 525/530
(58) Field of Search ................................. 525/223, 523, 525/539, 165, 408, 530, 208, 119, 438

(56) References Cited

U.S. PATENT DOCUMENTS 5,686,532 A * 11/1997 Bederke et al. ............. 525/222
6,060,556 A    5/2000 Collins et al.

FOREIGN PATENT DOCUMENTS

| EP | 0844285 A1 | 6/1998 |
| EP | 0598280 B1 | 9/1998 |
| JP | 06073334 A | 3/1994 |

* cited by examiner

Primary Examiner—David W. Wu
Assistant Examiner—Rip A Lee
(74) Attorney, Agent, or Firm—Steven C. Benjamin

(57) ABSTRACT

A coating compound comprising a binder/crosslinking agent system that comprises 20 wt. % to 80 wt. % of one or more carboxyl-functional components A) and 80 wt. % to 20 wt. % of one or more epoxy-functional (meth)acrylic copolymers B).

6 Claims, No Drawings

US 6,743,867 B1

COATING AGENTS WHICH CAN BE USED FOR MULTI-LAYER ENAMELING

FIELD OF THE INVENTION

The invention relates to coating compounds and the use thereof in the preparation of multi-layer lacquers, for example, in the automotive sector, particularly in the preparation of two-layer lacquers of the base lacquer/clear lacquer type.

BACKGROUND OF THE INVENTION

Coating compounds curing with ester formation and based on a combination of epoxy-functional component and carboxyl-functional component are known, for example, from EP-A-0 598 280. Generally speaking, coating compounds of this kind are characterised by good resistance to chemicals and acids of the coatings prepared therefrom and stoved, and they are therefore particularly suitable as clear lacquers or top coat lacquers in automotive OEM finishing.

The object of the invention is the provision of coating compounds crosslinkable by reaction of carboxyl and epoxy groups which are improved in terms of resistance to solvents, particularly resistance to super-grade petrol, particularly in the case of understoved coatings. It should be possible to use the coating compounds to be found as clear lacquer coating compounds for the production of base lacquer/clear lacquer two-layer lacquers, of the kind customarily found particularly in the field of automotive finishing.

SUMMARY OF THE INVENTION

The object is achieved by curable coating compounds containing a binder/crosslinking agent system, organic solvents and/or water, and optionally pigments and/or fillers and optionally further conventional lacquer additives, wherein the binder/ crosslinking agent system contains 20 wt. % to 80 wt. % of one or more carboxyl-functional components A) selected from carboxyl-functional (meth) acrylic copolymers and/or carboxyl-functional polyesters the carboxyl functionality of which corresponds in each case to an acid value from 15 to 300 mg KOH/g, and 20 wt. % to 80 wt. % of one or more epoxy-functional (meth)acrylic copolymers B) with a calculated epoxy equivalent from 200 g/mole to 700 g/mole, the percentages by weight adding up to 100 wt. %, and wherein the crosslinking ratio between carboxyl groups of components A) and epoxy groups of components B) is from 1:1 to 1:3, characterised in that the epoxy-functional (meth)acrylic copolymers B) have a branched molecule structure corresponding to a calculated branching equivalent weight from 5000 g/mole to 60,000 g/mole.

The binder/crosslinking agent system of the coating compounds according to the invention contains components A) and B) as essential components and optionally optional components C), D) and/or E) explained below. For example, the coating compounds according to the invention may contain only the components A) and B) as binder/ crosslinking agent system, or the binder/crosslinking agent system of the coating compounds according to the invention additionally contains the optional components C), D) and/or E).

The resin solids of the coating compounds according to the invention are formed from the sum of the resin solids or the non-volatile proportions of components A), B) and the optional components C), D) and E).

The curing of the coating compounds according to the invention is based on the chemical reaction, taking place during stoving, of the reactive groups of components A) and B) which are complementary to one another; said reaction is the addition of the carboxyl to the epoxy groups with the formation of carboxylic acid ester bonds.

DETAILED DESCRIPTION OF THE INVENTION

The coating compounds according to the invention contain, as component A), one or more carboxyl-functional components A). The carboxyl-functional component A) of the coating compounds according to the invention is carboxyl-functional (meth)acrylic copolymers and/or carboxyl-functional polyesters the carboxyl functionality of which corresponds in each case to an acid value from 15 to 300 mg KOH/g. The carboxyl-functional (meth)acrylic copolymers and/or carboxyl-functional polyesters may be urethanised and/or modified by reaction with lactones.

The optionally urethane group-containing and/or lactone-modified carboxyl-functionaries (meth)acrylic copolymers of component A) preferably have a number-average molecular weight (Mn) from 1000 g/mole to 30,000 g/mole. The optionally urethane group-containing and/or lactone-modified carboxyl-functionalised polyesters of component A) preferably have a calculated molecular weight from 500 g/mole to 4000 g/mole. The acid value is 15 to 300 mg KOH/g in each case, preferably 30 to 250 mg KOH/g.

During the preparation of the carboxyl group-containing (meth)acrylic copolymers or polyesters of component A), which may optionally contain urethane groups in each case, the carboxyl groups may be introduced directly by the use of carboxyl group-containing building blocks. Examples of suitable carboxyl group-containing monomers which may be used to construct carboxyl-group-containing (meth) acrylic copolymers include unsaturated carboxylic acids such as, e.g., acrylic, methacrylic, itaconic, crotonic, isocrotonic, aconitic, maleic and fumaric acid, half esters of maleic and fumaric acid and carboxyalkyl esters of (meth) acrylic acid, e.g. beta-carboxyethyl acrylate and adducts of hydroxyalkyl (meth)acrylates with carboxylic acid anhydrides such as, e.g., the ethyl ester of mono-2-(meth) acryloyloxy phthalic acid.

The expression (meth)acrylic is used in the present description and patent claims. This means acrylic and/or methacrylic.

During the preparation of carboxyl group-containing and optionally urethane group-containing (meth)acrylic copolymers or polyesters of component A), it is also possible, however, initially to construct a polymer containing hydroxyl groups and optionally already containing carboxyl groups and to introduce the carboxyl groups wholly or partially in a second step by reaction with carboxylic acid anhydrides. With this mode of operation, it is possible to operate with quantity ratios such that optionally sufficient hydroxyl groups remain to enable urethanisation to be carried out.

Carboxylic acid anhydrides suitable for the addition to the hydroxyl group-containing polymers which may already contain carboxyl groups include the anhydrides of di- and polycarboxylic acids such as, for example, preferably phthalic, tetrahydro-, methylhexahydro-, hexahydrophthalic and succinic anhydride.

Examples of monomers suitable for the introduction of hydroxyl groups into the optionally urethane group-containing (meth)acrylic copolymers of component A)

include hydroxyalkyl (meth)acrylates such as, e.g., hydroxyethyl (meth)acrylate, and the isomeric hydroxypropyl (meth)acrylates in terms of the position of the hydroxyl group, hydroxybutyl (meth)acrylates, and reaction products of (meth)acrylic acid with the glycidyl ester of a carboxylic acid with a tertiary alpha carbon atom. The formation of the latter reaction products may take place before, during or after the polymerisation reaction.

During the preparation of the (meth)acrylic copolymers of component A), further olefinically unsaturated monomers may be used in addition to the monomers mentioned above, particularly those which, apart from an olefinic double bond, contain no further functional groups.

Examples of further suitable olefinically unsaturated monomers include, in particular, alkyl esters of (meth)acrylic acid which contain, in the alkyl part, for example 1 to 20 carbon atoms or more, such as, e.g., methyl (meth)acrylate, ethyl (meth)acrylate, propyl (meth)acrylate, butyl (meth)acrylate, isoopropyl (meth)acrylate, isobutyl (meth)acrylate, tertiary-butyl (meth)acrylate, hexyl (meth)acrylate, cyclohexyl (meth)acrylate, 2-ethylhexyl (meth)acrylate, decyl (meth)acrylate, hexadecyl (meth)acrylate.

Examples of further suitable olefinically unsaturated monomers include the alkyl esters of maleic, fumaric, tetrahydrophthalic, crotonic, isocrotonic, vinylacetic and itaconic acid which contain, in the alkyl part, for example 1 to 20 carbon atoms or more.

Moreover, small proportions of monomers having at least two polymerisable, olefinic double bonds may also be used. The proportion of these monomers is preferably less than 5 wt. %, based on the total weight of the monomers. Examples of such compounds include hexane diol di(meth)acrylate, ethylene glycol di(meth)acrylate, butane diol di(meth)acrylate, hexamethylene-bis (meth)acrylamide, trimethylolpropane tri(meth)acrylate, divinyl benzene and similar compounds.

Monovinyl aromatic compounds are a further suitable component. They contain preferably 8 to 9 carbon atoms per molecule. Examples of suitable compounds include alpha-methylstyrene and the isomeric methylstyrenes, particularly vinyltoluenes and styrene.

The preparation of the (meth)acrylic copolymers of the carboxyl-functional component A) takes place by free-radical copolymerisation. It may prove advantageous to add part of the monomers at staggered intervals.

In order to prepare the (meth)acrylic copolymers of component A), the monomers or the monomer mixture used may contain radical initiators. If radical initiators are not contained in the monomer mixture, they may be added optionally at slightly staggered intervals or added separately to the monomer mixture. Post-polymerisation may then take place over a relatively long period, e.g. over a period of several hours. It is then possible to obtain the desired solids content, for example, of the order of magnitude of 30 wt. % to 80 wt. %, for example, 50 wt. % to 60 wt. %, using a conventional lacquer solvent.

The preparation takes place, for example, as free-radical solution polymerisation known to the skilled person, using for example 0.1 wt. % to 4 wt. %, based on the initial weight of monomers, of a radical initiator. Examples of radical initiators include dialkyl peroxides, diacyl peroxides, hydroperoxides, peresters, peroxydicarbonates, perketals, ketone peroxides; azo compounds such as 2,2'-azo-bis-(2,4-dimethylvaleronitrile), azo-bis-isobutyronitrile, C—C-splitting initiators such as, e.g., benzpinacol derivatives.

For the possible urethanisation of the carboxyl-functionalised (meth)acrylic copolymers of component A), hydroxyl groups of the carboxyl-functionalised (meth)acrylic copolymers of component A) may be reacted with mono-, di-, tri- or polyisocyanates in a further reaction step. Examples of isocyanates suitable for urethanisation include phenyl isocyanate, and the polyisocyanates mentioned below by way of example in the description of additional crosslinking agents D) and the defunctionalisation products thereof obtainable by reaction with less than stoichiometric amounts of monoalcohols, based on the isocyanate content. The amount of di-, tri- or polyisocyanates used for urethanisation is selected in a manner known to the skilled person in such a way that gelling is avoided. Naturally, it is also possible to urethanise hydroxyl-functional (meth)acrylic copolymers before carboxyl groups are introduced by reaction with acid anhydrides.

The carboxyl group-containing and optionally urethane group-containing polyesters of component A) may be constructed by conventional methods from aliphatic and/or cycloaliphatic dihydric, trihydric or higher alcohols, optionally together with monohydric alcohols and from aliphatic, aromatic and/or cycloaliphatic carboxylic acids, particularly dicarboxylic acids, and higher valency polycarboxylic acids. Examples of suitable alcohols include aliphatic diols such as ethylene glycol, propane-1,2-diol, propane-1,3-diol, 2,2-diethylpropane 1,3-diol, the isomeric butane diols, pentane-1,5-diol, 3-methylpentane-1,5-diol, hexane-1,6-diol, 2-ethylhexane-1,6-diol, 2,2,4-trimethylhexane-1,6-diol, 1,4-dimethylolcyclohexane, polyhydric aliphatic alcohols such as glycerol, trimethylolethane, ditrimethylolpropane, trimethylolpropane, pentaerythritol and etherification products of diols and polyols, e.g., di- and triethylene glycol, polyethylene glycol, neopentyl glycol esters of hydroxypivalic acid.

Examples of suitable carboxylic acids include adipic, azelaic, 1,3- and 1,4-cyclohexane dicarboxylic acid, tetrahydrophthalic, hexahydrophthalic, endomethyltetrahydrophthalic acid, the isomeric phthalic acids and anhydrides thereof and derivatives thereof capable of esterification.

Like the carboxyl-functional (meth)acrylic copolymers of component A) already described above, the carboxyl-functional polyesters of component A) may be urethanised. The reaction conditions and the polyisocyanates which may be used are the same as for the (meth)acrylic copolymers. It is possible to introduce the urethane groups by reaction of the carboxyl- and hydroxyl-functional polyesters with mono-, di-, tri- or higher functionality polyisocyanates. It is also possible to introduce the urethane groups during the synthesis of the polyesters themselves. This takes place, for example, by exchanging di- or tricarboxylic acids wholly or partially for di- or triisocyanates.

For the modification with lactones, the carboxyl groups of the carboxyl-functional (meth)acrylic copolymers and polyesters of component A) may be "chain-extended" with a lactone. The same applies to hydroxyl groups optionally contained in the (meth)acrylic copolymers and polyesters of component A). "Chain extension" is obtained as a result of the addition of lactones to the carboxyl- and/or hydroxyl groups taking place with ring opening. Terminal, exposed carboxyl- and hydroxyl groups are thereby obtained. The addition of lactones takes place preferably to carboxyl-functional (meth)acrylic copolymers and polyesters of component A) which are free from OH groups. The addition of the lactone takes place preferably as the final synthesis step during the preparation of the component A) concerned. An example of a particularly preferred lactone is epsilon caprolactone.

The curable coating compounds according to the invention contain epoxy-functional (meth)acrylic copolymer B)

with a calculated epoxy equivalent from 200 to 700 g/mole, preferably 250 to 500 g/mole and particularly 300 to 450 g/mole and a branched molecule structure corresponding to a calculated branching equivalent weight from 5000 to 60,000 g/mole, in each case based on the B) solids. The number-average molecular weight (Mn, determined by gel permeation chromatography with polystyrene standard) of the epoxy-functional (meth)acrylic copolymers B) may be, for example from 2500 to 10,000, preferably 3000 to 8000. The preparation of the epoxy-functional (meth)acrylic copolymers of component B) takes place by free-radical polymerisation, particularly solution polymerisation, it is well known to the skilled person, for example, from the above-mentioned explanations in connection with carboxyl-functional resins A) prepared by free-radical polymerisation. During free-radical copolymerisation, epoxy-functional, olefinically unsaturated monomers (I) capable of free-radical polymerisation and comonomers (II) capable of free-radical copolymerisation are used in a weight ratio such that the (meth)acrylic copolymers B) obtained have a calculated epoxy equivalent from 200 to 700 g/mole, preferably 250 to 500 g/mole and particularly 300 to 450 g/mole, and a calculated branching equivalent weight from 5000 to 60,000 g/mole, in each case based on the B) solids.

The term epoxy equivalent of meth)acrylic copolymers B) means the amount of solids of B) in grams which contains 1 mole of epoxy groups. The term branching equivalent weight of (meth)acrylic copolymers B) means the amount of solids B) in grams which contains 1 mole of branchings. The term branching within the meaning of the present invention means each individual binding site created by incorporation, by polymerisation, of di- or polyunsaturated comonomers, for example, of the type IIa described below, said binding sites lying between the inherently linear polymer backbones which are constructed substantially from monounsaturated monomers (such as, e.g., the types I and IIb explained below). This is illustrated by the example of a (meth)acrylic copolymer B), which contains divinylbenzene as the sole representative of comonomers leading to branching and completely incorporated by polymerisation: the amount of B) solid resin in grams which contains 1 mole of divinylbenzene completely incorporated by polymerisation corresponds to the branching equivalent weight of the (meth) acrylic copolymer B).

Examples of epoxy-functional, olefinically unsaturated monomers (I) capable of free-radical polymerisation and suitable for the preparation of epoxy-functional (meth) acrylic copolymers B) include (meth)allylglycidyl ether, 3,4-epoxy-1-vinylcyclohexane, epoxycyclohexyl (meth) acrylate, vinylglycidyl ether, but particularly glycidyl (meth) acrylate. The epoxy-functional (meth)acrylic copolymers B) are preferably glycidyl (meth)acrylate copolymers.

During the preparation of the epoxy-functional (meth) acrylic copolymers of component B), the comonomers (IIa) used lead to a branched molecule structure of the (meth) acrylic copolymers corresponding to a calculated branching equivalent weight of 5000 to 60,000 g/mole, based on the B) solids. Comonomers (IIa) are compounds having at least two olefinic double bonds capable of free-radical polymerisation in the molecule. Such comonomers are used, for example, in a proportion of 0.5 wt. % to 5 wt. %, based on the total weight of monomers used for the preparation of the (meth) acrylic copolymers of component B). Examples of comonomers (IIa) having at least two olefinic double bonds capable of free-radical polymerisation include hexane diol di(meth) acrylate, ethylene glycol di(meth)acrylate, butane diol di(meth)acrylate, hexamethylenebis(meth)acrylamide, trimethylolpropane tri(meth)acrylate, divinylbenzene. Further examples of comonomers (IIa) include compounds which may be prepared by condensation or preferably by addition reaction of complementary compounds which contain, in each case, in addition to one or more olefinic double bonds, one or more further functional groups in the molecule. The further functional groups of the individual complementary compounds are pairs of reactive groups which are complementary to one another, particularly groups which are able to react together within the meaning of a possible condensation or addition reaction. The condensation or addition reaction, optionally catalysed, may take place before or preferably during and/or after copolymerisation with complete consumption of one or both reactive groups which are complementary to one another. The comonomers (Ia) which may be prepared by condensation or preferably by addition reaction of complementary compounds may also be prepared separately in the first instance before they are used in copolymerisation for the preparation of the epoxy-functional (meth)acrylic copolymers B); they are preferably formed during copolymerisation in situ and/or after copolymerisation has ended. In each case, the formation of comonomers (IIa) takes place with complete consumption of one or both of the complementary reactive groups.

Within the context of the present invention, comonomers (IIa) prepared by addition reaction are preferred.

Non-restrictive examples of comonomers (IIa) containing more than one olefinic double bond and prepared by condensation reaction include reaction products formed from alkoxysilane-functional (meth)acrylic monomers after hydrolysis with dissociation of alcohol and formation of siloxane bridges. Further examples include reaction products formed from hydroxyalkyl(meth)acrylates and olefinically unsaturated isocyanates blocked on the isocyanate group such as isocyanatoalkyl (meth)acrylate or m-isopropenyl-alpha,alpha-dimethylbenzyl isocyanate, with dissociation of the blocking agent and formation of urethane groups.

Non-restrictive examples of comonomers (IIa) containing more than one olefinic double bond and prepared preferably by addition reaction include addition products formed from hydroxyalkyl (meth)acrylates and olefinically unsaturated isocyanates such as isocyanatoalkyl (meth)acrylate or m-isopropenyl-alpha,alpha-dimethylbenzyl isocyanate with the formation of a urethane group, or reaction products formed by ring opening addition of the epoxy group of unsaturated epoxy compounds to the carboxyl group of an unsaturated acid with the formation of an ester and an hydroxyl group. Within the context of the present invention, the addition product formed from glycidyl (meth)acrylate and (meth)acrylic acid is particularly preferred.

Apart from the epoxy groups, the (meth)acrylic copolymers B) may contain hydroxyl groups, for example, corresponding to an hydroxyl value up to 60 mg KOH/g, preferably from 0 to 40 mg KOH/g, based on the B) solids. The hydroxyl groups may originate, for example, from comonomers (IIa) having at least two olefinic double bonds and at least one hydroxyl group in the molecule and/or hydroxyl-functional comonomers (IIb) having only one olefinc double bond in the molecule are used. Comonomers (IIb) suitable for the introduction of an appropriate hydroxyl group content into the epoxy-functional (meth)acrylic copolymers of component B) include, for example, hydroxyalkyl (meth) acrylates such as, e.g., hydroxyethyl (meth)acrylate, isomeric hydroxypropyl (meth)acrylates in terms of the position of the hydroxyl group, hydroxybutyl (meth)acrylates and reaction products of (meth)acrylic acid and the glycidyl ester of a carboxylic acid with a tertiary alpha-carbon atom.

Apart from the epoxy-functional, olefinically unsaturated monomers (I), the comonomers (IIa) leading to a branched molecule structure, and the optionally contained hydroxyl-functional comonomers (IIb), the epoxy-functional (meth) acrylic copolymers may contain further comonomers (IIc) capable of free-radical copolymerisation which, apart from the olefinic double bond, contain no functional groups which influence or disturb the curing mechanism of the coating compounds according to the invention, particularly no further functional groups, for example, alkyl esters of (meth) acrylic acid which contain, for example, 1 to 20 carbon atoms or more in the alkyl part, such as, e.g., methyl (meth)acrylate, ethyl (meth)acrylate, propyl (meth)acrylate, butyl (meth)acrylate, isopropyl (meth)acrylate, isobutyl (meth)acrylate, tertiary-butyl (meth)acrylate, hexyl (meth) acrylate, (alkyl)cyclohexyl (meth)acrylate, (iso)bornyl (meth)acrylate, 2-ethylhexyl (meth)acrylate, decyl (meth) acrylate, hexadecyl (meth)acrylate, lauryl (meth)acrylate; monovinyl aromatic compounds such as alpha-methylstyrene, the isomeric methylstyrenes, vinyltoluenes, particularly styrene; alkyl esters of maleic, fumaric, tetrahydrophthalic, crotonic, isocrotonic, vinylacetic and itaconic acid which contain, for example, 1 to 20 carbon atoms or more in the alkyl part.

The branched (meth)acrylic copolymers B) preferably contain, apart from the epoxy groups and the optionally contained hydroxyl groups, no further functional groups; expressly, they contain no carboxyl groups or they are devoid of carboxyl groups.

The branched (meth)acrylic copolymers B) are particularly preferably those whose branchings are derived from glycidyl(meth)acrylate/(meth)acrylic acid adduct as comonomer (IIa), incorporated by polymerisation in a quantity proportion from 1 to 4 wt. %, based on the total amount of olefinically unsaturated monomers used to prepare the branched (meth)acrylic copolymers B).

During the preparation of the coating compounds according to the invention, the quantity ratios are selected such that the molar ratio of carboxyl to epoxy groups between the carboxyl group-containing component A) and the epoxy-functional (meth)acrylic copolymers B) is 1:1 to 1:3, preferably 1:1.2 to 1:2.5.

The coating compounds according to the invention may contain, in each case based on the solids content, 0 wt. % to 30 wt. %, e.g. 5 wt. % to 30 wt. %, of one or more polymer polyols C) which are different from components A) and B), based on the sum of the solids weights of components A) and B).

The polymer polyols C) are, for example, polymer polyols selected from hydroxyl-functional polyesters, polyurethanes and/or (meth)acrylic copolymers which are different from components A) optionally containing hydroxyl groups. The polymer polyols C) used in the coating compounds according to the invention have, for example, a number-average molecular weight (Mn) from 500 to 10,000. The polymer polyols C) have at least two hydroxyl functions in the molecule. Apart from the hydroxyl groups corresponding to an hydroxyl value from, for example, 30 to 350 mg KOH/g, the polymer polyols C) may also contain carboxyl groups corresponding to an acid value from 0 to 15 mg KOH/g. The polymer polyols C) preferably contain, in addition to the hydroxyl groups and the optionally present carboxyl groups, no further functional groups, particularly no epoxy groups.

Apart from components A), B) and C), the coating compounds according to the invention may also contain one or more additional crosslinking agents D) which are different from components A), B) and C) and which permit additional crosslinking, particularly with the incorporation of hydroxyl groups, for example, hydroxyl groups which are present in the binder system and/or which are formed during stoving during the course of the epoxide/carboxyl addition reaction. The additional crosslinking agents D) are contained in quantity proportions from, in total, 0 wt. % to 20 wt. %, based on the sum of components A), B) and C), in each case based on the solids content.

Examples of additional crosslinking agents D) include conventional coating aminoplastic resins, particularly melamine resins. Examples include butanol, isobutanol and/or methanol-etherified melamine resins.

Further examples of additional crosslinking agents D) include triazine-based components crosslinking with ester group formation, particularly with the formation of urethane groups (carbamic acid ester groups), such as preferably tris(alkoxycarbonylamino)triazine.

Further examples of additional crosslinking agents D) include conventional blocked polyisocyanates which may be prepared from free polyisocyanates by reaction with compounds capable of dissociation again under the stoving conditions and containing an active hydrogen atom.

Examples of suitable polyisocyanates include, in particular, cycloaliphatic and aliphatic diisocyanates such as tetramethylene diisocyanate, hexamethylene diisocyanate, 2,2,4-trimethylene diisocyanate, cyclohexane-1,3- and 1,4-diisocyanate, isophorone diisocyanate, biscyclohexyl-methane diisocyanate and polyisocyanates derived therefrom, for example, of the type containing biuret, isocyanurate, uretidione, carbodiimide, urethane and/or allophanate groups.

The well known polyisocyanates which are usually used in the preparation of lacquers are particularly suitable, e.g., modification products of the above-mentioned simple polyisocyanates containing biuret, isocyanurate or urethane groups, particularly tris-(6-isocyanatohexyl) biuret, the isocyanurate derived from isophorone diisocyanate or hexane diisocyanate, or low molecular weight polyisocyanates containing urethane groups, of the kind that may be obtained by reaction of isophorone diisocyanate used in excess with simple polyhydric alcohols in the molecular weight range from 62 to 300, particularly with trimethylolpropane. Conventional capping agents are used, for example, compounds having an active hydrogen atom, selected from CH-acidic compounds such as acetyl acetone, acetoacetic acid alkyl esters, malonic acid dialkyl esters; alcohols, oximes such as methylethylketoxime; lactams such as epsilon caprolactam; imidazole or pyrazole derivatives.

Further examples of additional crosslinking agents D) which may be contained in the coating compounds according to the invention include organic compounds which have at least two cyclic carboxylic acid anhydride groups per molecule. The carboxylic acid anhydride group content of these compounds (formally calculated as $C_4O_3$, molecular weight =96) is preferably 5 wt. % to 88 wt. %, particularly preferably 6 wt. % to 30 wt. %. Suitable examples include trimellitic anhydride esters of ethylene glycol, propylene glycol, diethylene glycol, triethylene glycol, neopentyl glycol, glycerol or trimethylolpropane, preferably prepared in a ratio of I mole of trimellitic anhydride per mole of hydroxyl groups.

Further suitable polyanhydrides include, for example, benzophenone tetracarboxylic acid dianhydride and 1,2,4,5-benzene tetracarboxylic acid dianhydride. Preferred polyanhydrides include copolymers of olefinically unsaturated monomers which contain, per molecule, on a statistical average, at least two cyclic carboxylic acid anhydride groups. These are preferably copolymers of maleic anhydride and/or itaconic anhydride with conventional comonomers as described, for example, in connection with component A).

Moreover, the coating compounds according to the invention may contain 0 wt. % to 10 wt. % of one or more polyepoxide components which are different from the epoxy-functional (meth)acrylic copolymers B) and/or one or more monoepoxy compounds E), in each case based on the sum of the A) and B) solids.

Examples of polyepoxide components E) which are different from the epoxy-functional (meth)acrylic copolymers of component B) include compounds having at least two epoxy functions in the molecule and a calculated epoxy equivalent from, for example, 200 to 700, preferably 250 to 500, and particularly 300 to 400, in each case based on solid resin. The number-average molecular weight (Mn) is preferably 200 to 10,000.

Examples of polyepoxide components E) include conventional di- or polyepoxides, e.g., polyglycidyl ethers based on diethylene glycol, dipropylene glycol, polypropylene glycol, bisphenol A or triglycidyl ethers of glycerol. Further examples of di- or polyepoxides include those based on di- or polyglycidyl esters.

Examples thereof include reaction products of 1-hydroxy-2,3-epoxypropane withphthalic or terephthalic acid to phthalic or terephthalic acid bis(2,3-epoxypropylester) or a diglycidyl ether of bisphenol A with trimellitic anhydride to polyesters, for example, having a number-average molecular weight (Mn) from 500 to 2000.

Preferred polyepoxide components E) include epoxy-functional (meth)acrylic copolymers, particularly glycidyl (meth)acrylate copolymers with an unbranched structure of the macromolecule. The number-average molecular weight (Mn) may be, for example, from 1000 to 10,000, preferably 2000 to 5000.

Monoepoxides E) are substances which are substantially non-volatile under the stoving conditions; for example, the volatile proportion is preferably less than 1 wt. %, based on the total amount of monoepoxide E). The molecular weights of monoepoxides E) are over 150 and compounds of this kind having a number-average molecular weight of up to 3000 are preferred, particularly preferably below 1000.

Examples of such compounds include, e.g., reaction products of a diglycidyl compound, e.g., a diglycidyl ether such as one mole of bisphenol A diglycidyl ether and one mole of a saturated or unsaturated monocarboxylic acid such as acetic acid propionic acid or isononanoic acid. Further examples include reaction products of di- or polyepoxides such as, e.g., polyglycidyl ether based on diethylene glycol, dipropylene glycol, polypropylene glycol with a number-average molecular weight (Mn) of up to 2000 and triglycidyl ethers of glycerol and/or polyphenols such as bisphenol A or F with the above-mentioned monocarboxylic acids. The glycidyl ester of versatic acid is particularly preferred.

The coating compounds according to the invention in the state ready for application have, for example, a solids content formed from the resin solids of the binder/crosslinking agent system and optionally contained further non-volatile constituents, from 35 wt. % to 60 wt. %. They contain, as volatile constituents, organic solvents of the kind conventionally used in the preparation of coating compounds, for example, lacquers. The organic solvents may be added separately during the preparation of the coating compounds according to the invention or they originate as a constituent from other components used in the preparation of the coating compounds according to the invention, for example, of the binder/crosslinking agent system. Examples include glycol ethers such as ethoxypropanol, butoxypropanol, hexylglycol, isopropyl glycol, methoxypropanol, methoxybutanol, butyl glycol, butyl diglycol, dipropylene glycol dimethylether, dipropylene glycol monomethylether, ethylene glycol dimethylether, diethylene glycol dimethylether, propylene glycol dimethyl ether, dipropylene glycol butylether; glycol ether esters such as ethyl glycol acetate, butyl glycol acetate, methyl glycol acetate, 3-methoxy-n-butyl acetate, butyl diglycol acetate, methoxy propyl acetate, ethylethoxy propionate, ethoxypropyl acetate, propylene glycol diacetate; esters such as butyrolactone, propylene carbonate, ethyl acetate, (iso)butyl acetate, (iso)amyl acetate; ketones such as methyl ethyl ketone, diethyl ketone, methyl isobutyl ketone, ethylamyl ketone, methyl isoamyl ketone, diisobutyl ketone, cyclohexanone, isophorone; alcohols such as methanol, ethanol, n- and isopropanol, n-and isobutanol 2-ethylhexanol, cyclohexanol, benzyl alcohol, isodecanol, isononyl alcohol, isotridecyl alcohol, ethylene glycol, propylene glycol, diethylene glycol, dipropylene glycol, triethylene glycol, hexylene glycol; aromatic hydrocarbons such as xylene, toluene, tetraline and mixtures of aromatic and araliphatic hydrocarbons in the boiling range from 150° C. to 270° C., e.g., Solvesso 100 (registered trademark for a mixture of aromatic hydrocarbons with a boiling range from 155° C. to 185° C.) and aliphatic hydrocarbons such as n-heptane, isoheptane, cyclohexane and mixtures of aliphatic hydrocarbons in the boiling range from 60° C. to 250° C., e.g. petrol and petroleum fractions.

The coating compounds according to the invention may also be present in aqueous form in which case they may be free from organic solvents or contain a small proportion of organic solvents. The water content is, e.g. 30 wt. % to 70 wt. %, the solvent content apart from water is, e.g., 0 wt. % to 20 wt. %. For the preparation of aqueous compositions it is possible, for example, largely to remove organic solvents from the carboxyl-functional component A), e.g., by distillation, then to neutralise part of the carboxyl groups, e.g., with bases such as triethylamine or dimethyl ethanolamine and then to form an emulsion in water. The other constituents of the coating compounds according to the invention may then, optionally, be incorporated into this emulsion in which component A) acts as an emulsifying resin. The addition of all the other constituents may also take place before emulsification.

It is also possible, for example, to mix the carboxyl-functional resin of component A) from which solvents have largely been removed with the resin of component B) from which solvent has largely been removed, and to emulsify said resins in a water/emulsifier mixture using a rotor/stator unit. It is also possible to emulsify the components separately and to mix the emulsions. Suitable emulsifiers include, e.g., ethoxylated sorbitan fatty acid esters.

If the coating compounds according to the invention are to be used as pigmented top coat lacquers, for example, in the preparation of the outer top layer of a multi-layer lacquer, they contain pigments and optionally fillers. The pigment plus filler/resin solids weight ratio is in the range from, for example, 0.05 to 2:1. Examples of pigments include inorganic and/or organic coloured pigments and/or special-effect pigments such as, e.g., titanium dioxide, iron oxide pigments, carbon black, azo pigments, phthalocyanine pigments, quinacridone pigments, metallic pigments, e.g., of titanium, aluminium or copper, interference pigments such as, e.g., titanium dioxide-coated aluminium, coated mica, graphite effect-like special-effect pigments, iron oxide in flake form, copper phthalocyanine pigments in flake form. Examples of fillers include conventional lacquer fillers such as, e.g., talc and silicates.

Moreover, the coating compounds according to the invention which may be used as pigmented top coat lacquers or preferably as transparent clear lacquers may contain conventional lacquer additives in conventional amounts, for example, up to 5 wt. %, based on the total lacquer, e.g., transparent pigments or fillers, levelling agents, reactive thinners, colorants, light stabilisers, antioxidants, rheology influencing agents such as, e.g., disubstituted ureas, polymer microparticles, for example, epoxy-functional polymer microparticles, compounds yielding formaldehyde at the latest during stoving, catalysts for catalysing the reaction of carboxyl and epoxy groups and/or for catalysing the optionally possible additional crosslinking.

The coating compounds according to the invention may be applied by known methods, particularly by spraying in layer thicknesses, for example, from 25 μm to 60 μm. After an evaporation phase, the applied coating compound is crosslinked by heating. The stoving temperatures are, e.g., 60° C. to 180° C., preferably 60° C. to 160° C.

The coating compounds according to the invention may be used, for example, for the preparation of the outer pigmented top coat lacquer layer of a multi-layer lacquer. In this respect, the present invention also relates to the use of the coating compounds according to the invention as top coat lacquer compounds.

The coating compounds according to the invention are formulated preferably as transparent clear lacquers which may be used for the preparation of the outer clear lacquer layer of a multi-layer lacquer. In this respect, the present invention also relates to the use of the coating compounds according to the invention as clear lacquer coating compounds. For example, the clear lacquer coating compound according to the invention may be applied to a substrate provided with a colour-imparting and/or special effect-imparting single-layer or multi-layer precoating and stoved. The stoving temperatures of the clear lacquer coating compounds according to the invention are from, for example, 60° C. to 160° C. For automotive applications, they are from, for example, 60° C. to 160° C., for applications in automotive finishing, e.g., in automotive OEM finishing, particularly from 80° C. to 160° C. and preferably from 120° C. to 150° C.

The clear lacquer coating compounds according to the invention are preferably used for the preparation of a base lacquer/clear lacquer multi-layer lacquer. The application of a colour-imparting and/or special effect-imparting base lacquer layer to an optionally precoated substrate, particularly to precoated automobile bodies or parts thereof, takes place before the clear lacquer coating layer has been applied from a clear lacquer coating compound according to the invention and stoved.

The colour-imparting and/or special effect-imparting base lacquer layer may be stoved before the application of the clear lacquer layer from the clear lacquer coating compound according to the invention, but the clear lacquer coating compound according to the invention is preferably applied by the known wet-in-wet method to the base lacquer layer which determines the shade of the multi-layer lacquer. The application of the base lacquer layer takes place by spraying from a colour-imparting and/or special effect-imparting waterborne or solvent-based base lacquer in a dry layer thickness which depends on the shade, for example, from 10 μm to 25 μm. Following the application of the base lacquer layer, after a brief flash-off phase, e.g., at 20° C. to 80° C., the application of the clear lacquer layer from the clear lacquer coating compound according to the invention takes place, for example, by spraying, for example, in a dry layer thickness of generally from 25 μm to 50 μm. Optionally, a brief flash-off may be carried out. The substrate is then passed to the stoving process in which the clear lacquer coating layer is stoved together with the base lacquer layer at elevated temperatures, for example, from 60° C. to 160° C.

The coating compounds according to the invention are unaffected by understoving conditions. It is possible, with the coating compounds according to the invention, to prepare multi-layer lacquers, particularly base lacquer/clear lacquer two-layer lacquers, particularly on motor vehicles and parts thereof with an outstanding optical-aesthetic impression, good weathering resistance, good resistance to chemicals, acids and solvents.

EXAMPLE 1

Preparation of an Unbranched Epoxy-functional Methacrylic Copolymer

A charge of 1963 g of xylene was prepared and heated to reflux with stirring. A mixture of 327.6 g of butyl acrylate, 168.0 g of butyl methacrylate, 260.4 g of styrene, 1260.0 g of glycidyl methacrylate and 84.0 g of tertiary-butyl perbenzoate was added dropwise within a period of 5 h. The mixture was then rinsed again with 168 g of xylene. The mixture was then post-polymerised under reflux for 6 h. The calculated branching equivalent weight was infinity.

EXAMPLE 2

Preparation of a Branched Epoxy-functional Methacrylic Copolymer

Operations were carried out as in Example 1 except that, instead of 1260.0 g of glycidyl methacrylate, 1246.6 g of glycidyl methacrylate and 13.4 g of acrylic acid were used.

The calculated branching equivalent weight was 11284.

EXAMPLE 3

Preparation of a Branched Epoxy-functional Methacrylic Copolymer

Operations were carried out as in Example 1 except that, instead of 1260.0 g of glycidyl methacrylate, 1239.8 g of glycidyl methacrylate and 20.2 g of acrylic acid were used.

The calculated branching equivalent weight was 7485.

Clear lacquers (A, Comparison Example; B and C, both according to the invention) were prepared by mixing the constituents (parts by weight) given in the Table below.

| Constituents | A | B | C |
|---|---|---|---|
| Carboxyl-functional polyester[1] | 40.0 | 40.0 | 40.0 |
| Resin solution from Example 1 | 52.9 | | |
| Resin solution from Example 2 | | 54.7 | |
| Resin solution from Example 3 | | | 55.6 |
| Light stabiliser | 2.1 | 2.1 | 2.1 |

-continued

| Constituents | A | B | C |
|---|---|---|---|
| Butylglycol acetate | 1 | 1 | 1 |
| Butanol | 5 | 5 | 5 |
| Solvesso 100 | 5 | 5 | 5 |

1) Carboxyl-functional polyester based on trimethylolpropane/1,4-cyclohexane dicarboxylic acid/hexahydrophthalic anhydride/caprolactone, acid value 215 mg KOH/g The clear lacquers were applied with a knife to glass sheets. The lacquers were then flashed off for 5 minutes and then stoved for 10 minutes (1 st series at 125° C., 2nd series at 130° C.). High-gloss clear lacquer films were obtained. The clear lacquer films thus obtained were covered with filter paper on to which xylene was sprinkled. Evaporation of the xylene was prevented by covering with a glass. After 10 minutes, the filter paper was removed and the solvent residues removed.

The results of the pendulum hardness measurement (König) on unexposed clear lacquer films prior to exposure to xylene and after 15 minutes' and after 2 hours' recovery from exposure to xylene can be derived from the Table below.

|  | A 1st/2nd series | B 1st/2nd series | C 1st/2nd series |
|---|---|---|---|
| Pendulum hardness beforehand | 129/132 | 114/135 | 124/140 |
| Pendulum hardness after 15 min recovery | 14/60 | 23/111 | 68/124 |
| Pendulum hardness after 2 h recovery | 27/72 | 42/117 | 84/131 |

What is claimed is:

1. A coating compound comprising:
    a binder/crosslinking agent system that comprises:
        20 wt. % to 80 wt. % of one or more carboxyl-functional components A) selected from carboxyl-functional (meth)acrylic copolymers, carboxyl-functional polyesters, or a combination thereof, which in each case may be urethanised or modified with lactone and the carboxyl functionality of which corresponds in each case to an acid value from 15 to 300 mg KOH/g, and
        80 wt. % to 20 wt. % of one or more epoxy-functional (meth)acrylic copolymers B) with a calculated epoxy equivalent from 200 g/mole to 700 g/mole,
        the percentages by weight of components A) and B) adding up to 100 wt. %, and the crosslinking ratio between the carboxyl groups of component A) and the epoxy groups of component B) being from 1:1 to 1:3,
        0 wt. % to 30 wt. % of one or more polymer polyols C) which are different from components A) and B), based on the sum of the solids weights of components A) and B),
        0 wt. % to 20 wt. % of one or more additional crosslinking agents D) which are different from components A), B) and C), based on the sum of components A), B) and C), and
        0 wt. % to 10 wt. % of one or more polyepoxides, monoepoxides, or a combination thereof E) which are different from component B), based on the sum of the solids weights of components A) and B),
    wherein the epoxy-functional (meth)acrylic copolymers B) have a branched molecule structure corresponding to a calculated branching equivalent weight from 5000 to 60,000 g/mole.

2. A coating compound according to claim 1 that is in aqueous form, and which further comprises an emulsifier or wherein a part of the carboxyl groups of component A) is in the neutralised form.

3. A process for multi-layer lacquering comprising applying at least one of a colour-imparting and special effect-imparting base lacquer layer to an optionally precoated substrate, and applying a clear lacquer coating layer, wherein said clear lacquer coating layer comprises the coating compound according to one of claims 1 or 2.

4. The coating compound according to claim 1 or 2 that is a pigmented or transparent clear lacquer coating compound used in the preparation of a multi-coat lacquer.

5. The coating compound according to claim 4 that is an automobile lacquer coating compound.

6. A coating compound comprising a binder/crosslinking agent system that comprises:
    20 wt. % to 80 wt. % of one or more carboxyl-functional components A) selected from carboxyl-functional (meth)acrylic copolymers, carboxyl-functional polyesters, or a combination thereof, which in each case may be urethanised or modified with lactone and the carboxyl functionality of which corresponds in each case to an acid value from 15 to 300 mg KOH/g; and
    80 wt. % to 20 wt. % of one or more epoxy-functional (meth)acrylic copolymers B) with a calculated epoxy equivalent from 200 g/mole to 700 g/mole,
wherein the percentages by weight of components A) and B) add up to 100 wt. %, and the crosslinking ratio between the carboxyl groups of component A) and the epoxy groups of component B) being from 1:1 to 1:3, and
wherein the epoxy-functional (meth)acrylic copolymers B) have a branched molecule structure corresponding to a calculated branching equivalent weight from 5000 to 60,000 g/mole.

* * * * *

UNITED STATES PATENT AND TRADEMARK OFFICE
CERTIFICATE OF CORRECTION

PATENT NO.    : 6,743,867 B1
DATED         : June 1, 2004
INVENTOR(S)   : Carmen Flosbach et al.

It is certified that error appears in the above-identified patent and that said Letters Patent is hereby corrected as shown below:

Column 2,
Line 21, "carboxyl-functionaries" to be replaced with -- carboxyl-functional --

Column 6,
Line 14, "(Ia)" to be replaced with -- (IIa) --

Signed and Sealed this

Seventeenth Day of August, 2004

JON W. DUDAS
*Acting Director of the United States Patent and Trademark Office*